United States Patent
Teng et al.

(10) Patent No.: US 8,157,536 B2
(45) Date of Patent: Apr. 17, 2012

(54) ROTATING SPEED ADJUSTMENT CIRCUIT AND RELATED CONTROL SYSTEM FOR A HEAT DISSIPATION FAN

(75) Inventors: Tzu-Cheng Teng, Taipei (TW);
Ching-Sheng Li, Hsinchu County (TW);
Ming-Jung Tsai, Chang-Hua (TV);
Shen-Min Lo, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 695 days.

(21) Appl. No.: 12/344,190

(22) Filed: Dec. 24, 2008

(65) Prior Publication Data

US 2010/0054964 A1    Mar. 4, 2010

(30) Foreign Application Priority Data

Sep. 3, 2008    (TW) ................................ 97133715 A (51) Int. Cl.
*F04B 49/00* (2006.01)
(52) U.S. Cl. .............. 417/32; 417/22; 417/42; 388/800; 388/910; 388/934
(58) Field of Classification Search .................. 318/461, 318/471, 599, 811; 388/800, 804, 811, 819, 388/910, 934; 417/22, 32, 42, 326
See application file for complete search history.

(56) References Cited

U.S. PATENT DOCUMENTS

| | | | |
|---|---|---|---|
| 3,976,894 A | 8/1976 | Perkins, Jr. | |
| 5,457,766 A * | 10/1995 | Ko | 388/831 |
| 5,757,221 A * | 5/1998 | Hayashi | 327/360 |
| 5,901,268 A * | 5/1999 | Ando et al. | 388/811 |
| 6,545,438 B1 | 4/2003 | Mays, II | |
| 7,279,947 B2 * | 10/2007 | Chiu et al. | 327/172 |
| 2004/0100240 A1 * | 5/2004 | Natsume et al. | 323/282 |
| 2004/0263105 A1 * | 12/2004 | Tsai et al. | 318/471 |
| 2008/0088268 A1 * | 4/2008 | Sakaguchi | 318/471 |
| 2009/0096544 A1 * | 4/2009 | Li | 332/110 |
| 2009/0108786 A1 * | 4/2009 | Li | 318/434 |

FOREIGN PATENT DOCUMENTS

TW    M326290    1/2008
WO    WO 2006033214 A1 *    3/2006

* cited by examiner

*Primary Examiner* — Nimeshkumar Patel
*Assistant Examiner* — Steven Horikoshi
(74) *Attorney, Agent, or Firm* — Winston Hsu; Scott Margo (57) ABSTRACT

A rotating speed adjustment circuit for a heat dissipation fan includes a first node, a second node, a reception end for receiving a first control signal, a first resistor coupled to a voltage source and the first node, a second resistor coupled to the first node and the second node, a third resistor coupled to the second node and a ground end, a capacitor coupled to the first node and the ground end, a transistor coupled to the reception end, the second node and the ground end, an oscillator for generating an oscillating signal, and a comparator for comparing a signal of the first node and the oscillating signal, so as to output a second control signal to control a rotating speed of the heat dissipation fan.

11 Claims, 15 Drawing Sheets

ROTATING SPEED ADJUSTMENT CIRCUIT AND RELATED CONTROL SYSTEM FOR A HEAT DISSIPATION FAN

BACKGROUND OF THE INVENTION

1. Field of the Invention

The present invention relates to a rotating speed adjustment circuit and related control system for a heat dissipation fan, and more particularly, to a rotating speed adjustment circuit and related control system capable of avoiding vibration and noise caused by current ripples on the fan coil, and preventing inaccuracy of passive devices from affecting the rotating speed.

2. Description of the Prior Art

In modern information society, a computer system has become a necessary tool in daily life. For any kind of computer system, an operating clock of a CPU is becoming higher and higher, causing heat generated more and more. Therefore, heat dissipation has become more important. In the prior art, a fan is a main way for heat dissipation. For saving energy and reducing noise, a lot of methods are developed to control a rotating speed of a CPU fan, one of which in particular is simultaneously utilizing two sets of signal sources to control the rotating speed.

Figure 1:
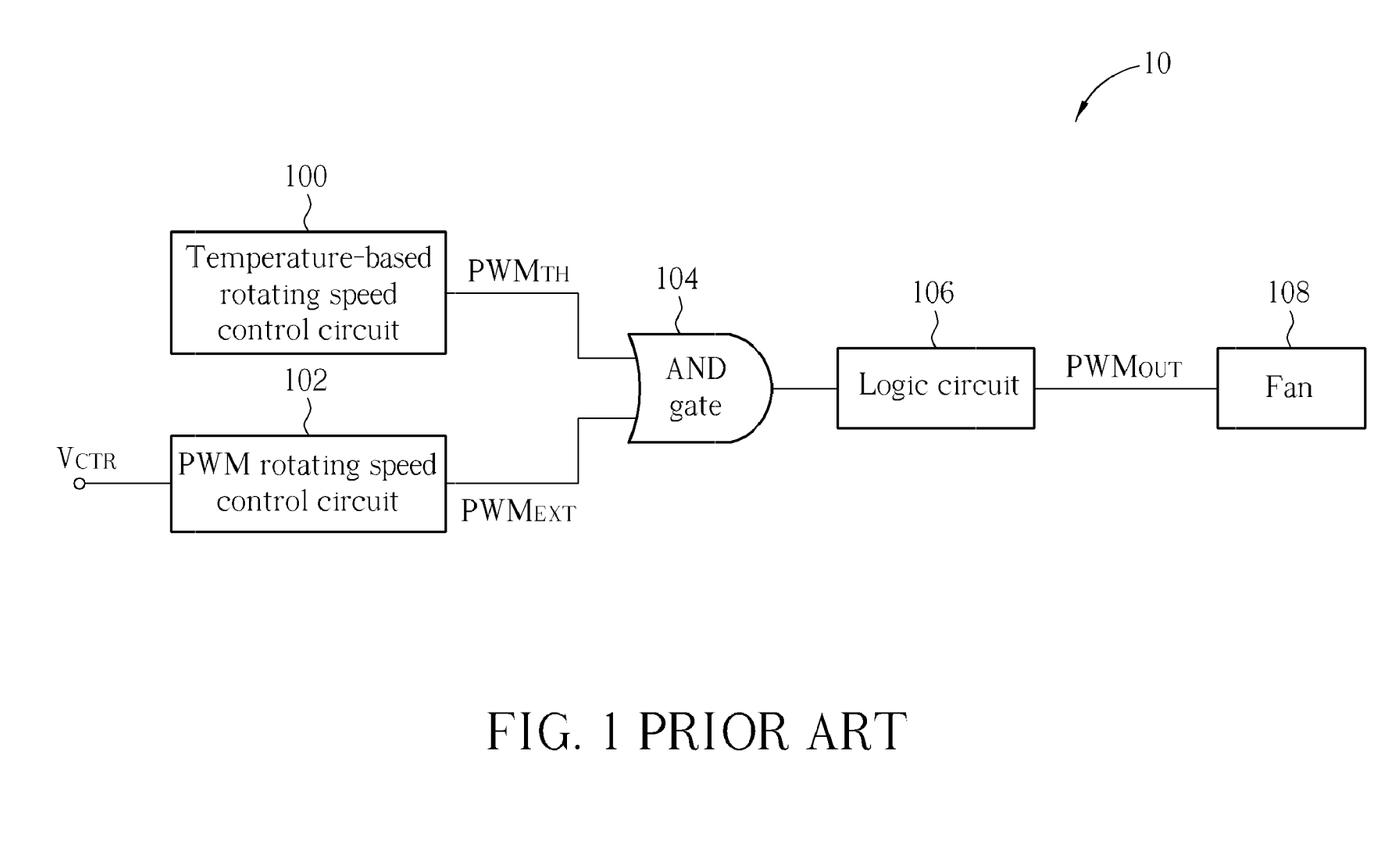
FIG. 1 is a schematic diagram of a fan control system utilizing two sets of signal sources in the prior art.

Please refer to FIG. 1, which is a schematic diagram of a fan control system 10 utilizing two sets of signal sources in the prior art. The fan control system 10 is utilized for controlling a rotating speed of a fan 108, and comprises a temperature-based rotating speed control circuit 100, a pulse width modulation (PWM) rotating speed control circuit 102, an AND gate 104 and a logic circuit 106. The temperature-based rotating speed control circuit 100 is utilized for sensing a temperature, e.g. the temperature of the air dissipated by the fan 108, to generate a temperature control signal $PWM_{TH}$. The PWM rotating speed control circuit 102 is utilized for receiving a system control signal $V_{CTR}$ outputted by the outer control circuit, e.g. the CPU, to generate a temperature control signal $PWM_{EXT}$. The AND gate 104 is utilized for performing an AND operation on the temperature control signal $PWM_{TH}$ and the temperature control signal $PWM_{EXT}$. The logic circuit 106 can output a temperature control signal $PWM_{OUT}$ to perform pulse width modulation on the fan 108, so as to control the rotating speed of the fan 108 by two signal sources.

Figure 2A:
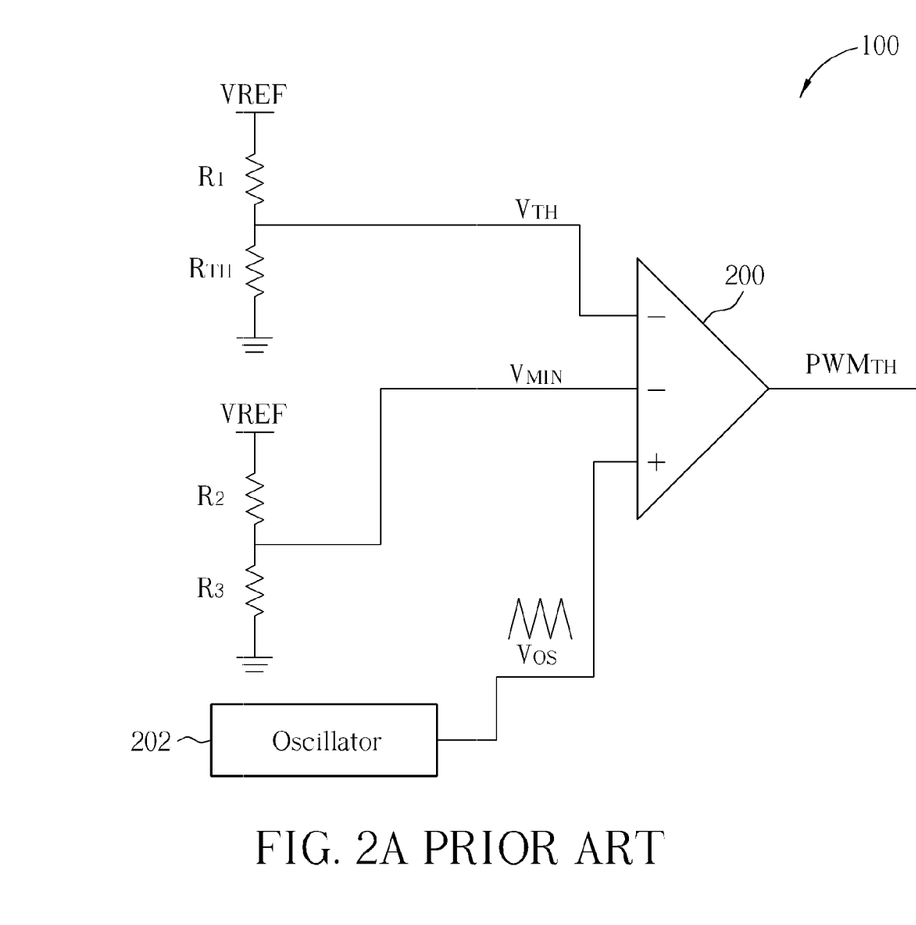
FIG. 2A is a schematic diagram of the temperature-based rotating speed control circuit shown in FIG. 1.
Figure 2B:
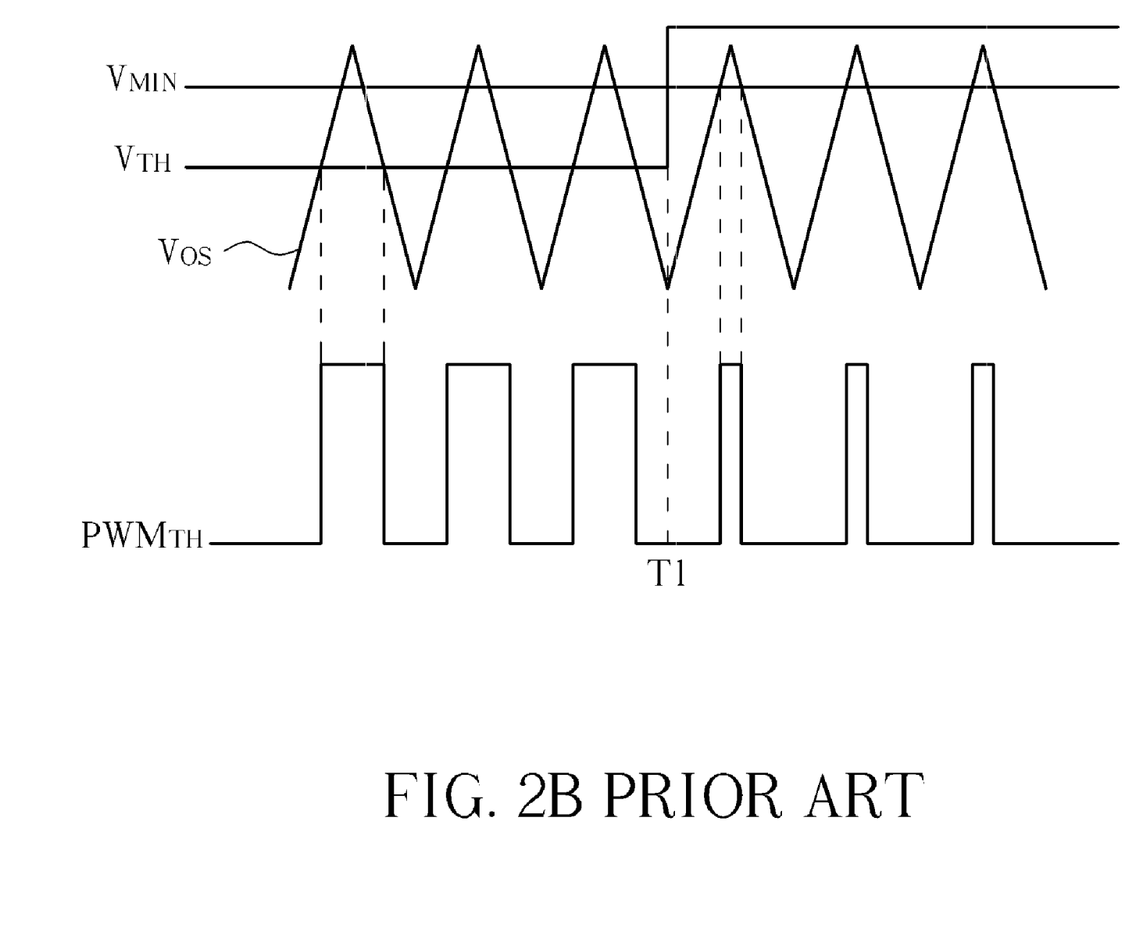
FIG. 2B is a schematic diagram of related waveforms of the temperature-based rotating speed control circuit.
Figure 2C:
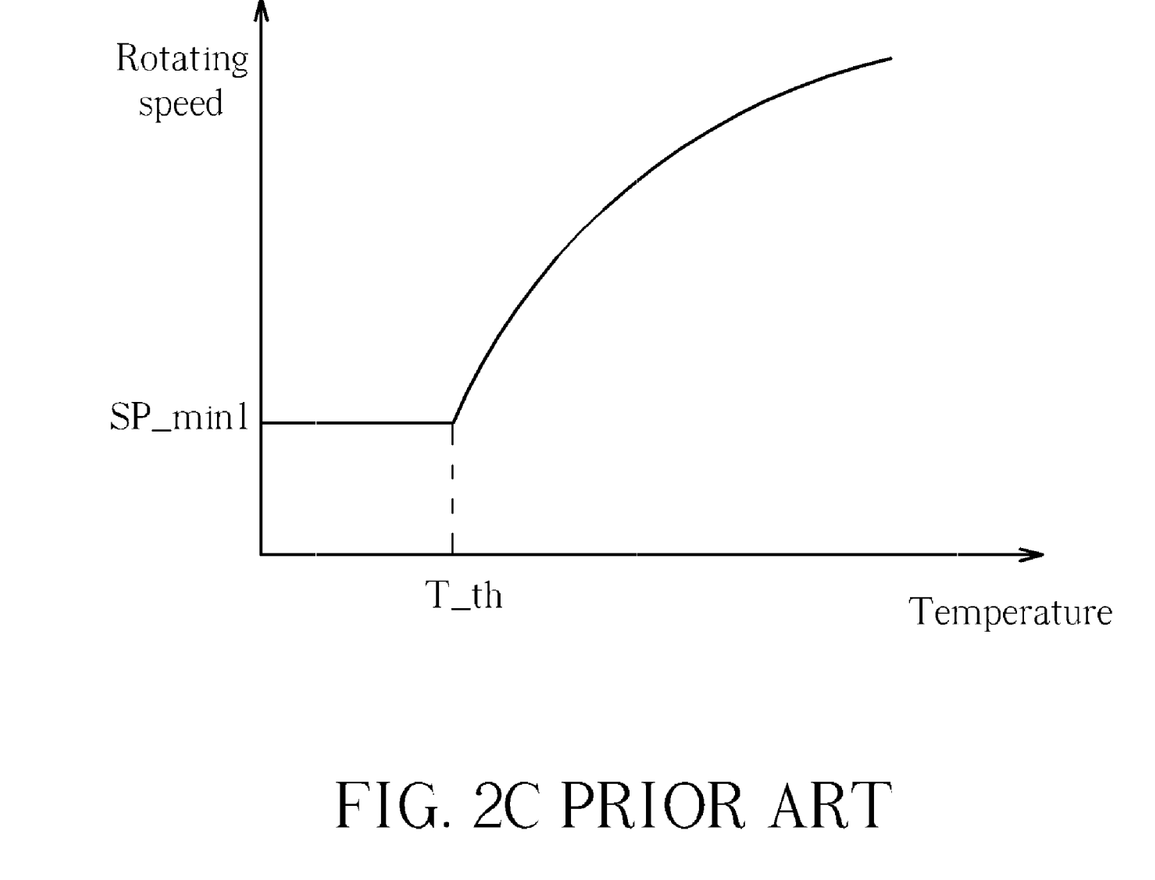
FIG. 2C is a schematic diagram of the rotating speed corresponding to the temperature-based rotating speed control circuit.

Please refer to FIG. 2A, FIG. 2B and FIG. 2C. FIG. 2A is a schematic diagram of the temperature-based rotating speed control circuit 100 shown in FIG. 1. FIG. 2B is a schematic diagram of related waveforms of the temperature-based rotating speed control circuit 100. FIG. 2C is a schematic diagram of the rotating speed corresponding to the temperature-based rotating speed control circuit 100. The temperature-based rotating speed control circuit 100 comprises a thermistor $R_{TH}$, resistors $R_1$, $R_2$, $R_3$, a comparator 200 and an oscillator 202. The thermistor $R_{TH}$ and the resistor $R_1$ are coupled in a sequence between a reference voltage VREF and a ground, to generate a division voltage $V_{TH}$. Since resistance of the thermistor $R_{TH}$ is negatively proportional to the temperature, the voltage $V_{TH}$ is lower when the temperature is higher. Besides, the resistors $R_2$, $R_3$ are utilized for dividing voltage to generate a voltage $V_{MIN}$, which is utilized for configuring a lowest rotating speed SP_min1 to avoid the fan 108 stopped due to too low temperature. The oscillator 202 is utilized for generating an oscillating signal $V_{OS}$. The comparator 200 is utilized for comparing the voltages $V_{TH}$, $V_{MIN}$ and the oscillating signal $V_{OS}$, so as to output the temperature control signal $PWM_{TH}$ to the AND gate 104.

As shown in FIG. 2B and FIG. 2C, when the temperature sensed by the thermistor $R_{TH}$ is higher than a threshold temperature T_th, that is, before time T1, the voltage $V_{TH}$ will be lower than the voltage $V_{MIN}$, causing the duty cycle of the temperature control signal $PWM_{TH}$ increased, to increase the rotating speed of the fan 108, and dissipate more heat. On the contrary, when the temperature sensed by the thermistor $R_{TH}$ is lower than the threshold temperature T_th, that is, after time T1, the voltage $V_{TH}$ will be higher than the voltage $V_{MIN}$, causing the duty cycle of the temperature control signal $PWM_{TH}$ to stay in the minimum duty cycle, so as to control the rotating speed of the fan 108 to be in the lowest rotating speed SP_min1, and avoid the fan 108 stopped due to too low temperature.

Figure 3A:
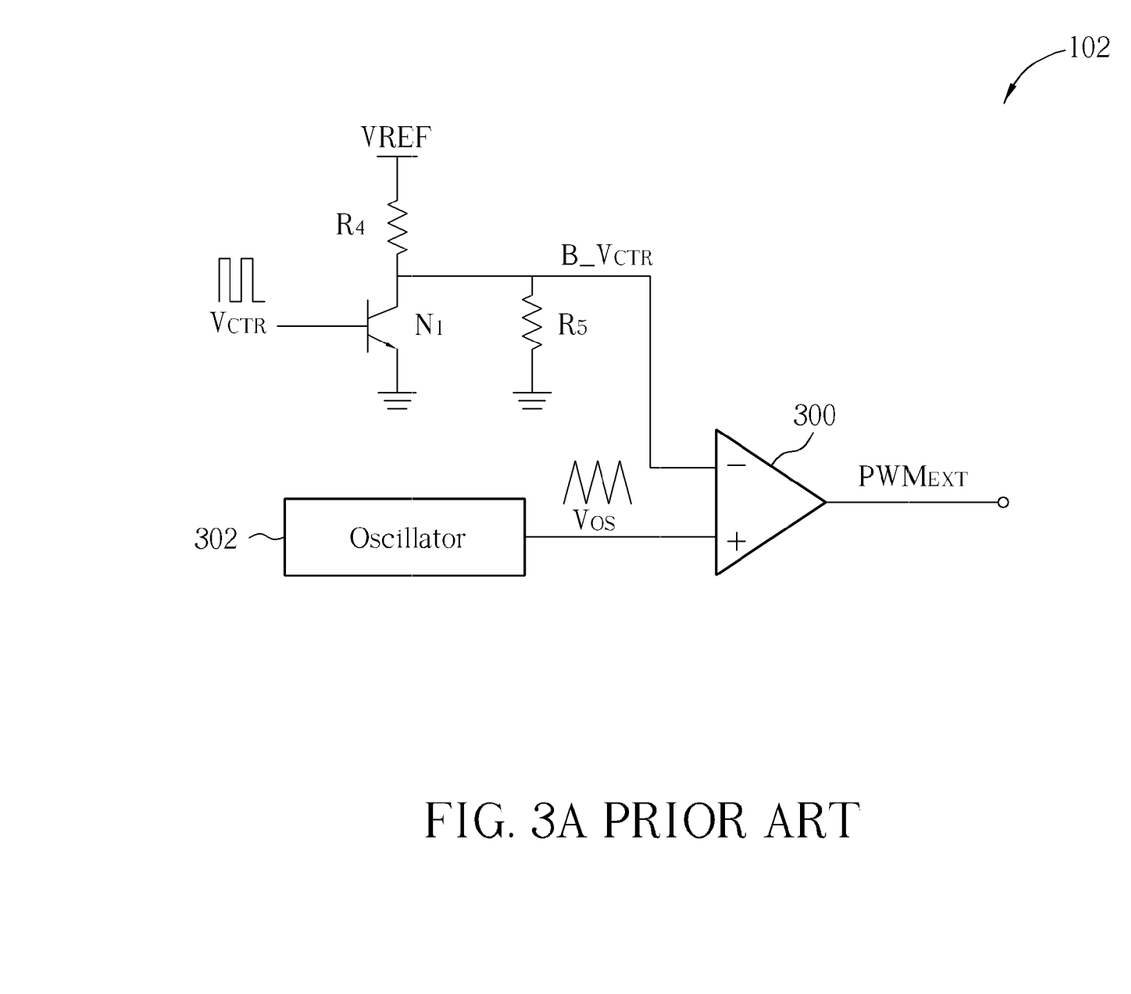
FIG. 3A is a schematic diagram of the PWM rotating speed control circuit shown in FIG. 1.
Figure 3B:
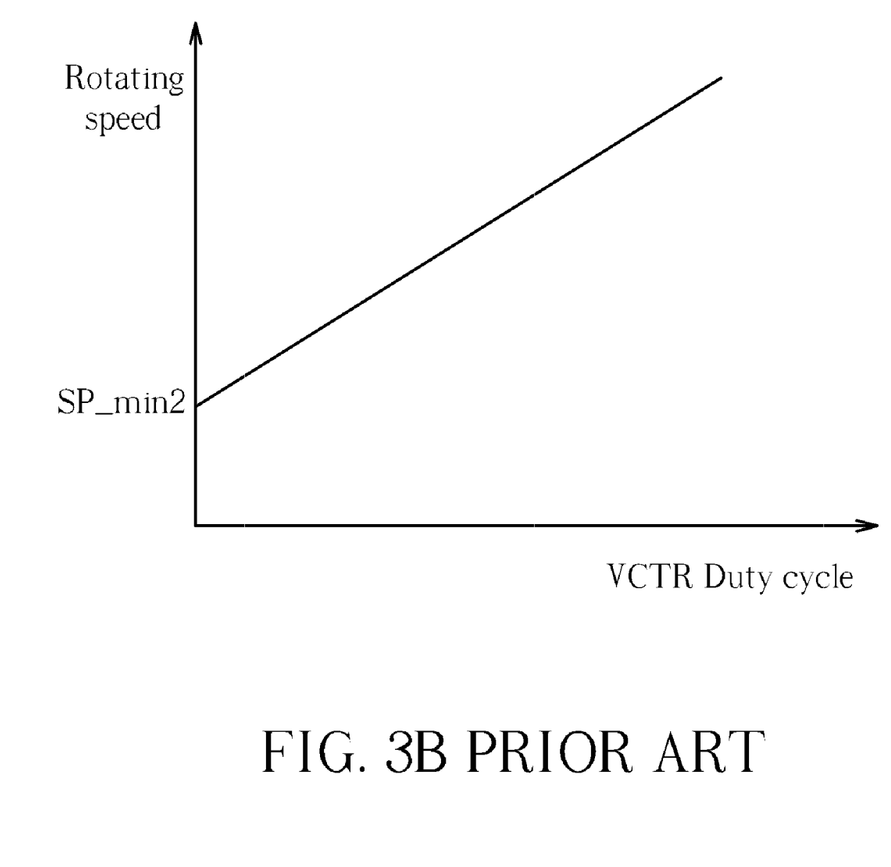
FIG. 3B is a schematic diagram of the rotating speed corresponding to the PWM rotating speed control circuit.

On the other hand, please refer to FIG. 3A and FIG. 3B. FIG. 3A is a schematic diagram of the PWM rotating speed control circuit 102 shown in FIG. 1. FIG. 3B is a schematic diagram of the rotating speed corresponding to the PWM rotating speed control circuit 102. The PWM rotating speed control circuit 102 comprises a transistor $N_1$, resistors $R_4$, $R_5$, a comparator 300, an oscillator 302. The transistor $N_1$ is a bipolar junction transistor, and can generate a system control signal $B\_V_{CTR}$ opposite to the system control signal $V_{CTR}$. The system control signal $B\_V_{CTR}$ is compared with the oscillating signal $V_{OS}$ generated by the oscillator 302, so as to derive a temperature control signal $PWM_{EXT}$. The resistors $R_4$, $R_5$ are utilized for adjusting the high potential voltage of the signal $B\_V_{CTR}$, so as to determine the lowest rotating speed SP_min2. The rotating speed is thereof shown in FIG. 3B.

Therefore, via the temperature-based rotating speed control circuit 100 and the PWM rotating speed control circuit 102, the fan control system 10 can control the rotating speed of the fan 108 by simultaneously utilizing two signal sources. However, the above-mentioned method has the following drawbacks.

Figure 4A:
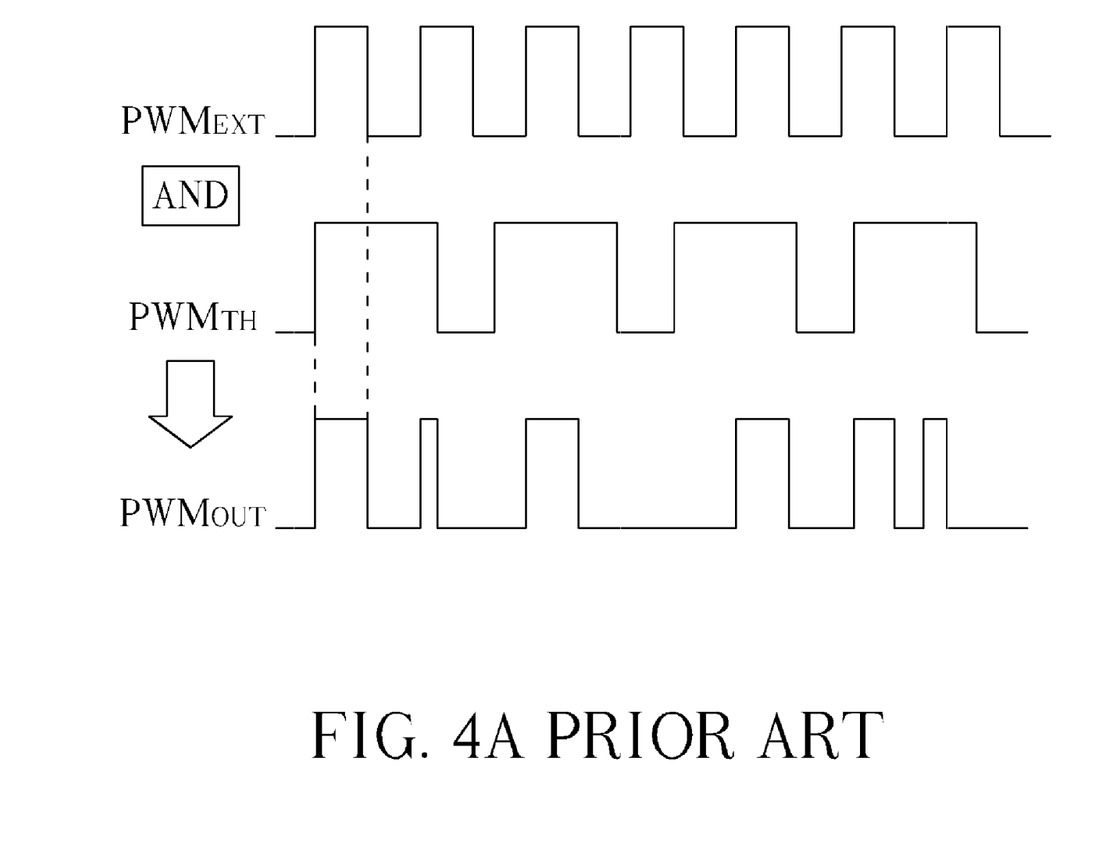
FIG. 4A is a schematic diagram of the fan control system shown in FIG. 1 performing an AND operation.

First, the duty cycle of the temperature control signal $PWM_{OUT}$ derived by performing AND operation on the temperature control signal $PWM_{TH}$ and $PWM_{EXT}$ will not be a stable value. Instead, as shown in FIG. 4A, it will generate current ripples on the fan coil, causing problems of vibration and noise.

Second, in the temperature-based rotating speed control circuit 100, since variation of the resistance of the thermistor $R_{TH}$ related to the temperature is insufficient, the highest and lowest voltage ranges of the oscillator 202 are needed to be shrunk to compromise the characteristics of the thermistor $R_{TH}$. However, if the highest and lowest voltage ranges are too small, the rotating speed will be affected dramatically by inaccuracy of the passive devices in the circuit.

Figure 4B:
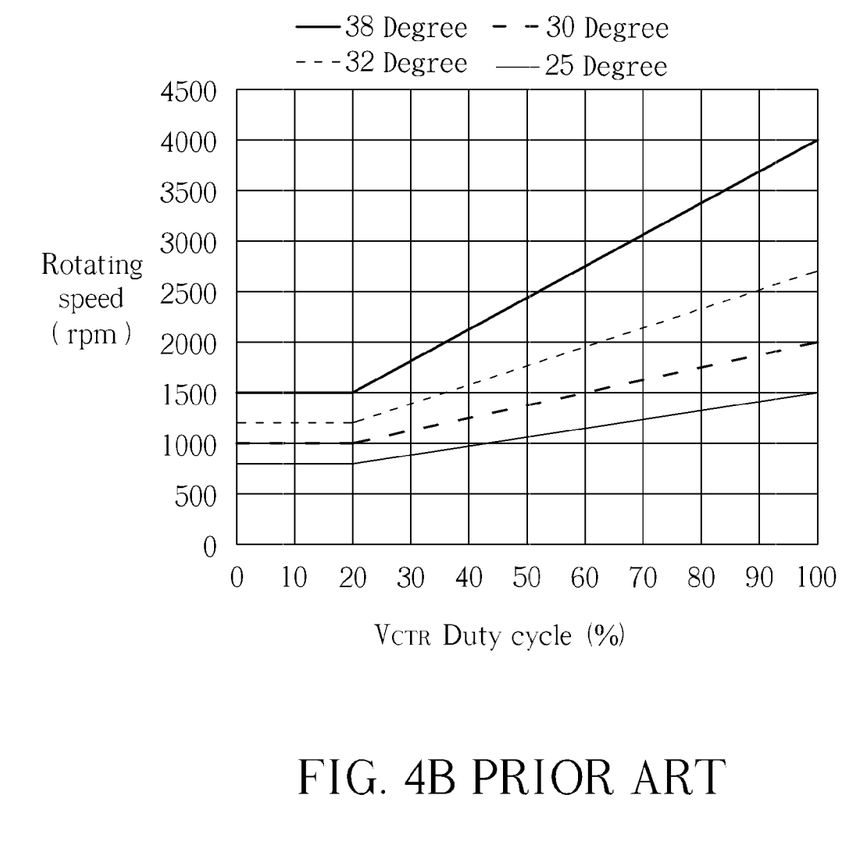
FIG. 4B is a schematic diagram of characteristics of the rotating speed of the fan control system shown in FIG. 1.

Third, a specification of the CPU fan requires that the CPU fan must be maintain a fixed rotating speed when the duty cycle of the system control signal $V_{CTR}$ is less than 20%, to ensure the CPU fan to generate a basic amount of wind and reach the purposes of saving energy. However, the fan control system 10 in the prior art can not meet the specification, because the lowest rotating speed thereof changes with working temperature as shown in FIG. 4B.

Thus, for the heat dissipation fan controlled both by temperature-based and PWM signals, the industries are devoted to research a fan control system which can overcome the drawbacks mentioned above.

SUMMARY OF THE INVENTION

It is therefore a primary objective of the claimed invention to provide a rotating speed adjustment circuit and related control system for a heat dissipation fan.

The present invention discloses a rotating speed adjustment circuit for a heat dissipation fan. The rotating speed adjustment circuit comprises a first node, a second node, a reception end, a first resistor, a second resistor, a third resistor, a capacitor, a transistor, an oscillator and a comparator. The reception end is utilized for receiving a first control signal for controlling a rotating speed of the heat dissipation fan. The first resistor is coupled between a voltage source and the first node. The second resistor is coupled between the first node and the second node. The third resistor is coupled between the second node and a ground end. The capacitor is coupled between the first node and the ground end. The transistor comprises a first end coupled to the reception end, a second end coupled to the second node, and a third end coupled to the ground end, for controlling a signal connection from the second end to the third end according to a signal of the first end. The oscillator is utilized for generating an oscillating signal. The comparator comprises a first input end coupled to the first node, a second input end coupled to the oscillator and an output end, for comparing signals of the first node and the oscillating signal, so as to output a second control signal via the output end to control the rotating speed of the heat dissipation fan.

The present invention further discloses a fan control system for a heat dissipation fan. The fan control system comprises a temperature-based rotating speed control circuit, a pulse width modulation (PWM) rotating speed control circuit, an AND gate, a rotating speed adjustment circuit, and a logic circuit. The temperature-based rotating speed control circuit is utilized for sensing a temperature of the heat dissipation fan to generate a first temperature control signal. The PWM rotating speed control circuit is utilized for receiving a system control signal to generate a second temperature control signal. The AND gate is coupled to the temperature-based rotating speed control circuit and the PWM rotating speed control circuit, for performing an AND operation on the first temperature control signal and the second temperature control signal, so as to generate a first control signal. The rotating speed adjustment circuit comprises a first node, a second node, a reception end, a first resistor, a second resistor, a third resistor, a capacitor, a transistor, an oscillator and a comparator. The reception end is coupled to the AND gate for receiving the first control signal. The first resistor is coupled between a voltage source and the first node. The second resistor is coupled between the first node and the second node. The third resistor is coupled between the second node and a ground end. The capacitor is coupled between the first node and the ground end. The transistor comprises a first end coupled to the reception end, a second end coupled to the second node, and a third end coupled to the ground end, for controlling a signal connection from the second end to the third end according to a signal of the first end. The oscillator is utilized for generating an oscillating signal. The comparator comprises a first input end coupled to the first node, a second input end coupled to the oscillator and an output end, for comparing signals of the first node and the oscillating signal, so as to output a second control signal via the output end. The logic circuit is coupled to the output end of the comparator and the heat dissipation fan, for driving the heat dissipation fan according to the second control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 5A:
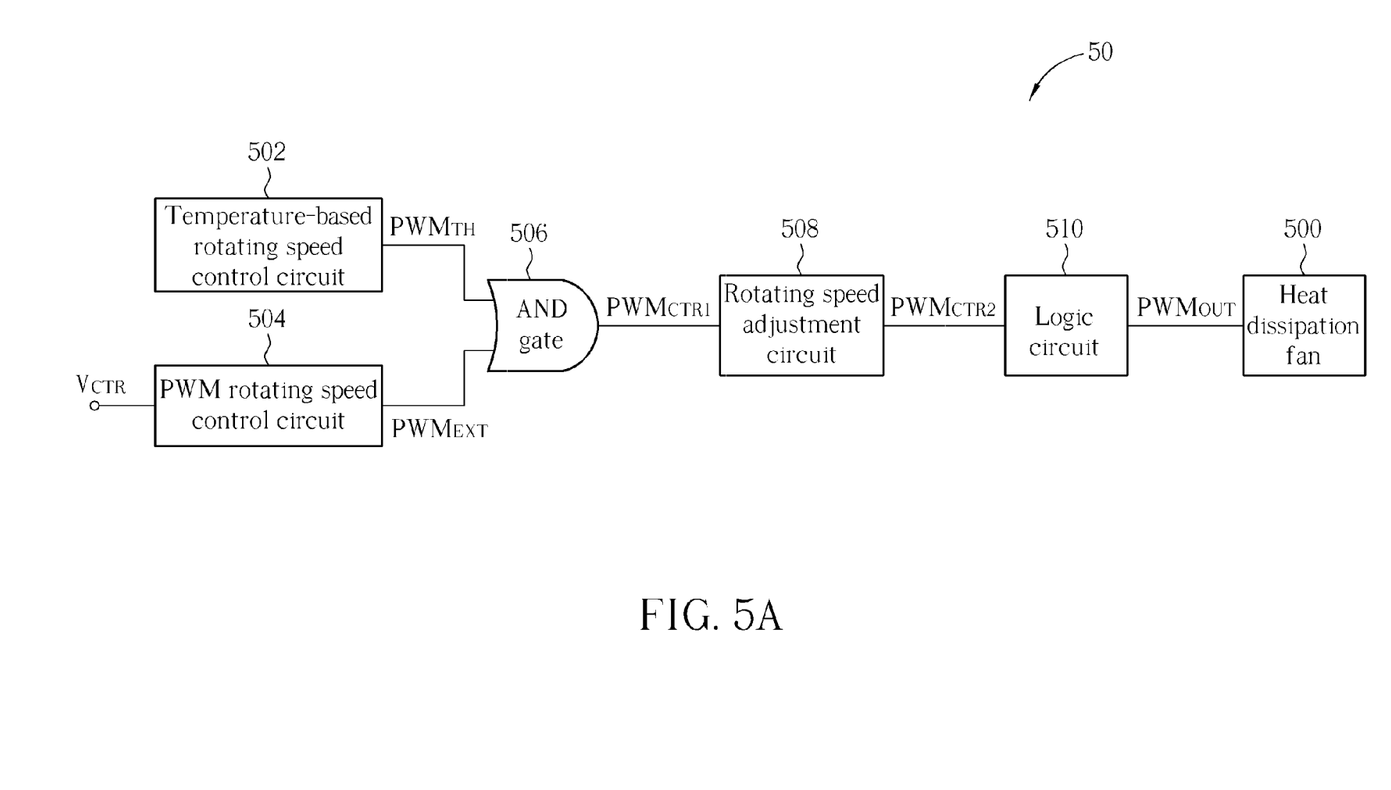
FIG. 5A is a schematic diagram of a fan control system according to an embodiment of the present invention.

Please refer to FIG. 5A, which is a schematic diagram of a fan control system 50 according to an embodiment of the present invention. The fan control system 50 is utilized for driving a heat dissipation fan 500, and comprises a temperature-based rotating speed control circuit 502, a pulse width modulation (PWM) rotating speed control circuit 504, an AND gate 506, a rotating speed adjustment circuit 508 and a logic circuit 510. The temperature-based rotating speed control circuit 502 is utilized for sensing a temperature of the heat dissipation fan 500 to generate a temperature control signal $PWM_{TH}$. The PWM rotating speed control circuit 504 is utilized for receiving a system control signal $V_{CTR}$ to generate a temperature control signal $PWM_{EXT}$. The AND gate 506 is coupled to the temperature-based rotating speed control circuit 502 and the PWM rotating speed control circuit 504, and is utilized for performing an AND operation on the temperature control signal $PWM_{TH}$ and the temperature control signal $PWM_{EXT}$, so as to generate a first control signal $PWM_{CTR1}$. The rotating speed adjustment circuit 508 is coupled to the AND gate 506, and is utilized for generating a second control signal $PWM_{CTR2}$ to the logic circuit 510 according to the first control signal $PWM_{CTR1}$. The logic circuit 510 can output a temperature control signal $PWM_{OUT}$ to perform pulse width modulation on the heat dissipation fan 500.

Figure 5B:
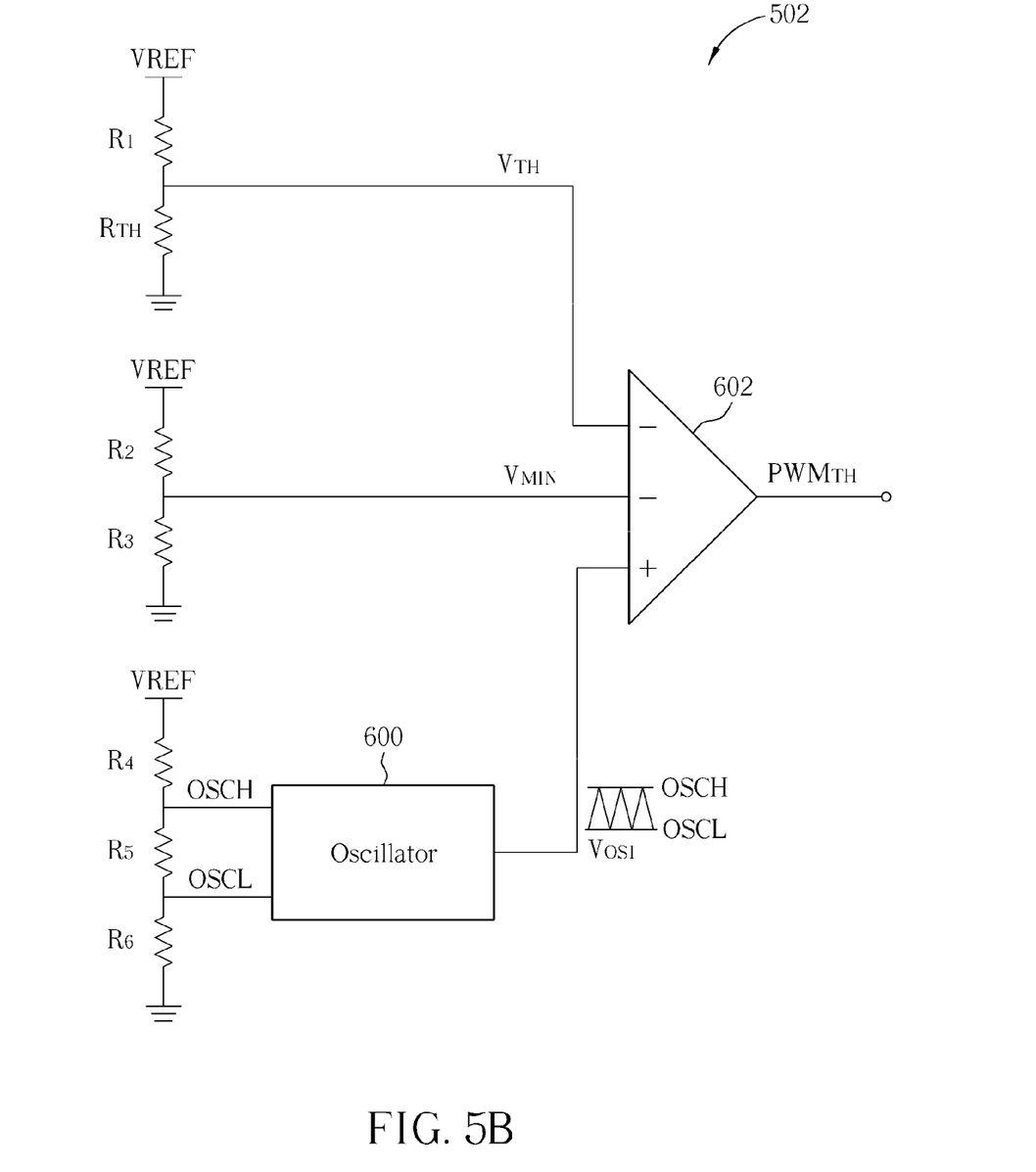
FIG. 5B is a schematic diagram of the temperature-based rotating speed control circuit shown in FIG. 5A.
Figure 5C:
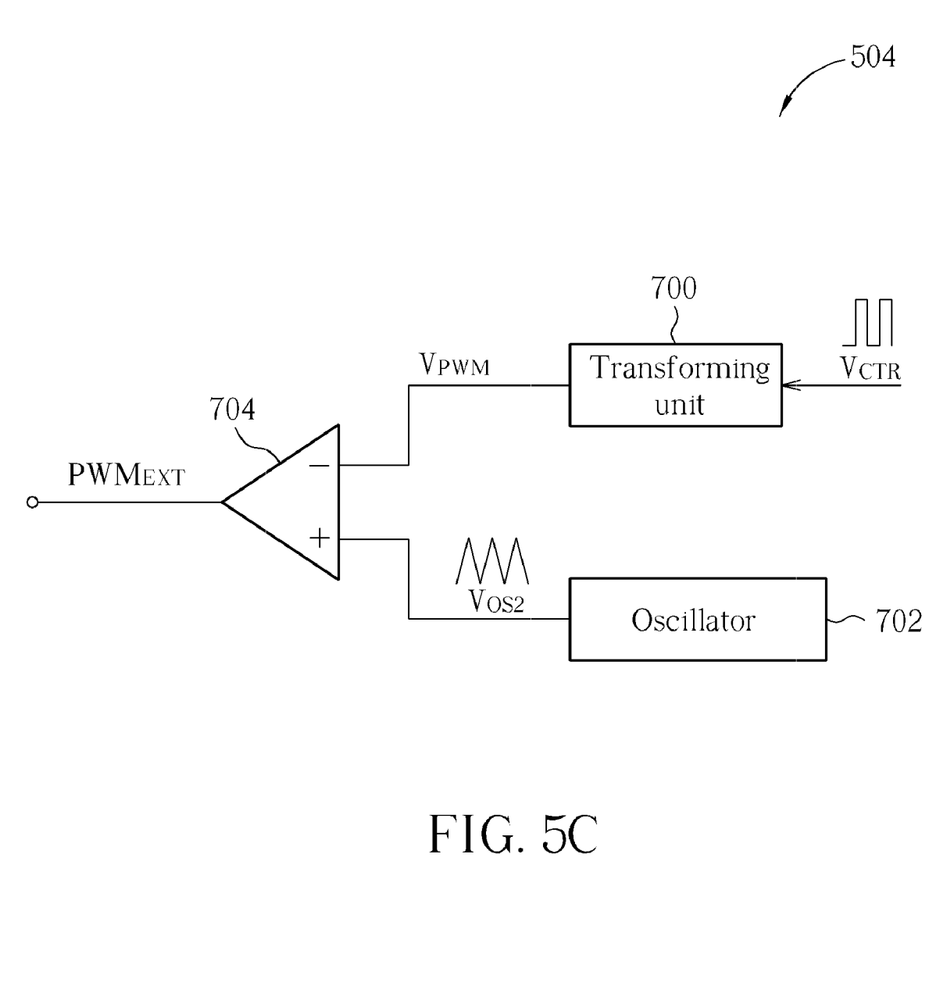
FIG. 5C is a schematic diagram of the PWM rotating speed control circuit shown in FIG. 5A.
Figure 5D:
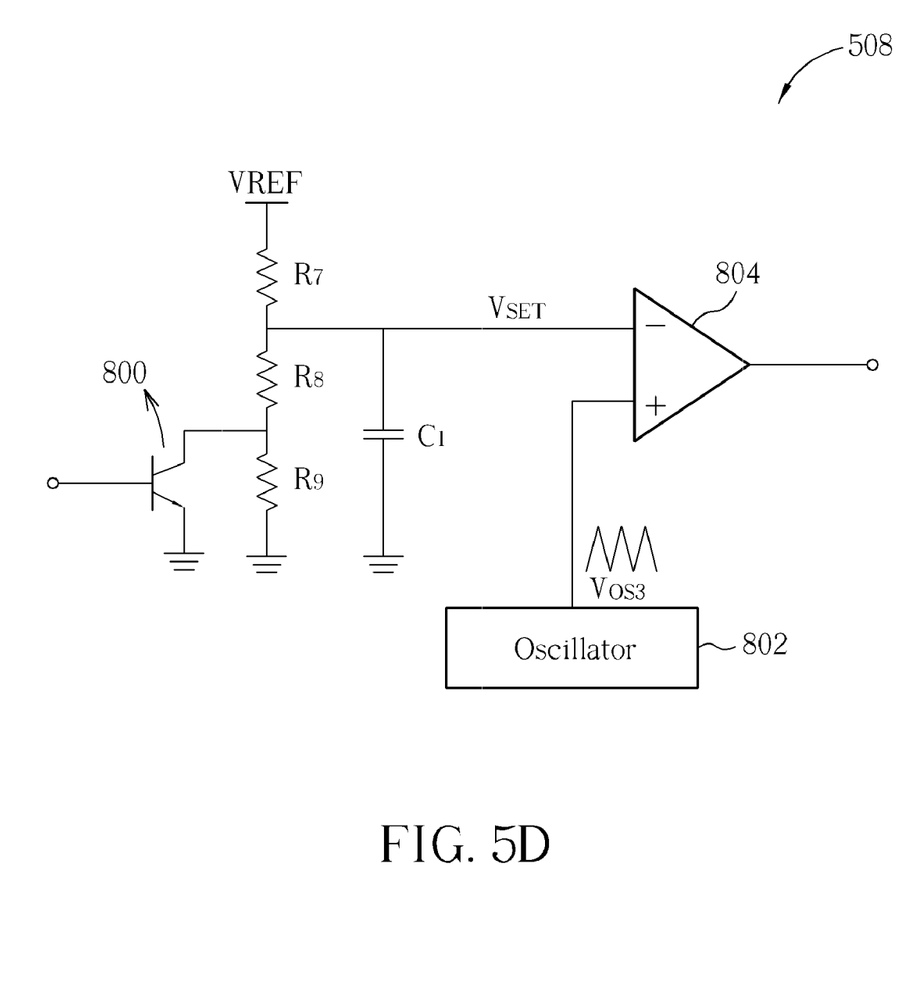
FIG. 5D is a schematic diagram of the rotating speed adjustment circuit shown in FIG. 5A.

Please refer to FIG. 5B, FIG. 5C and FIG. 5D, which are respectively schematic diagrams of the temperature-based rotating speed control circuit 502, the PWM rotating speed control circuit 504 and the rotating speed adjustment circuit 508 shown in FIG. 5A. In FIG. 5B, the temperature-based rotating speed control circuit 502 comprises a thermistor $R_{TH}$, resistors $R_1$~$R_6$, an oscillator 600 and a comparator 602. Structures and operations of the temperature-based rotating speed control circuit 502 are similar to those of the temperature-based rotating speed control circuit 100 shown in FIG.

2A. That is, the thermistor $R_{TH}$ and the resistor $R_1$ are utilized for determining the voltage $V_{TH}$, and the resistors $R_2$, $R_3$ are utilized for determining the voltage $V_{MIN}$. Moreover, the resistors $R_4$, $R_5$, $R_6$ are utilized for determining the high voltage OSCH and the low voltage OSCL of the oscillating signal $V_{OS1}$ generated by the oscillator 600, so as to conform to specifications of the fan. Please note that, resistance of the resistors $R_4$, $R_5$, $R_6$ can be adjusted by those skilled in the art according to different requirements. For example, at 38° C. when the thermistor $R_{TH}$ is 6 Kohm, the highest rotating speed of the heat dissipation fan 500 is required to be 100%, and at 30° C. when the thermistor $R_{TH}$ is 9 Kohm, the highest rotating speed of the heat dissipation fan 500 is required to be 50%. If resistance of the resistor $R_1$ is 7.5 Kohm and the voltage VREF is 5V, the following equations can be derived.

$$V_{TH}(38° C.) = 5 \times \frac{6}{6+7.5} = 2.222\ V;$$

$$V_{TH}(30° C.) = 5 \times \frac{9}{9+7.5} = 2.727\ V;$$

To meet the requirement that the highest rotating speed of the heat dissipation fan 500 is 100% at 38° C., the voltage OSCL can be set as 2.222V. To meet the requirement that the highest rotating speed of the heat dissipation fan 500 is 50% at 30° C., the voltage OSCH can be derived by the following equation.

$$OSCH = OSCL + \left|\frac{V_{TH}(38° C.) - V_{TH}(30° C.)}{100\% - 50\%}\right|$$
$$= 2.222 + \left|\frac{2.222 - 2.727}{0.5}\right|$$
$$= 3.232\ V;$$

Then, resistance of the resistors $R_4$, $R_5$, $R_6$ can be adjusted properly to make the voltage OSCH and OSCL be the required values. Besides, the voltage $V_{MIN}$ is utilized for determining the lowest working temperature of the temperature-based rotating speed control circuit 502. If we hope the rotating speed of the heat dissipation fan 500 does not change with temperature when the temperature is below 30° C., we can set $V_{MIN}$ to be 2.727V. As a result, when the temperature is below 30° C., the voltage $V_{TH}$ is higher than the voltage $V_{MIN}$. In such a condition, the duty cycle of the temperature control signal $PWM_{TH}$ is determined by the voltages $V_{MIN}$ and $V_{OS1}$.

In FIG. 5C, the PWM rotating speed control circuit 504 comprises a transforming unit 700, an oscillator 702 and a comparator 704. The transforming unit 700 is coupled to the system control signal $V_{CTR}$ for transforming the system control signal $V_{CTR}$ into a direct-current (DC) voltage signal $V_{PWM}$. The oscillator 702 is utilized for generating an oscillating signal $V_{OS2}$. The comparator 704 is coupled to the transforming unit 700 and the oscillator 702, and is utilized for comparing the DC voltage signal $V_{PWM}$ and the oscillating signal $V_{OS2}$, so as to output the temperature control signal $PWM_{EXT}$ to the AND gate 506.

Figure 6A:
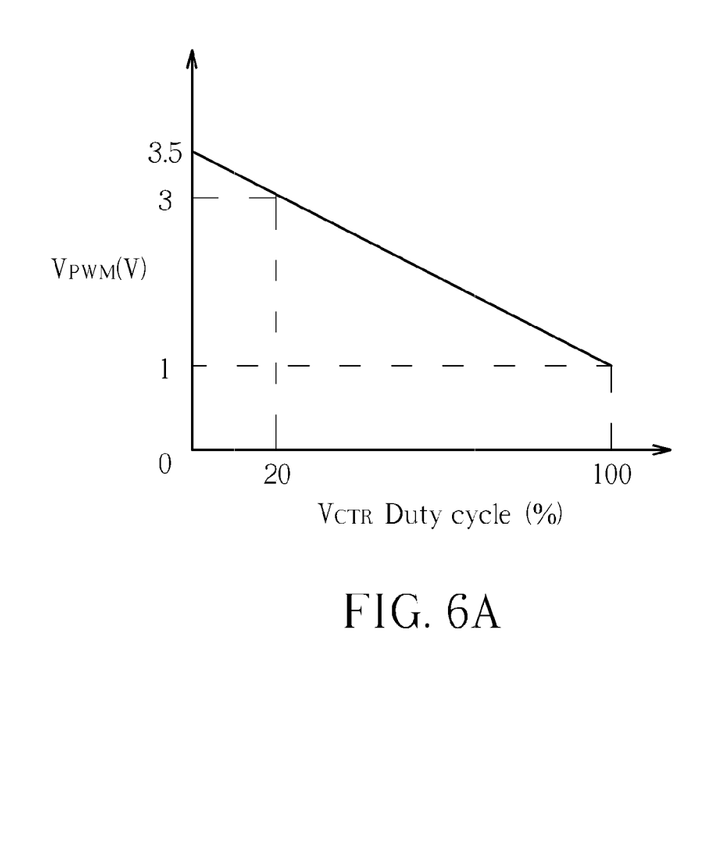
FIG. 6A and FIG. 6B are schematic diagrams related to the PWM rotating speed control circuit shown in FIG. 5C.
Figure 6B:
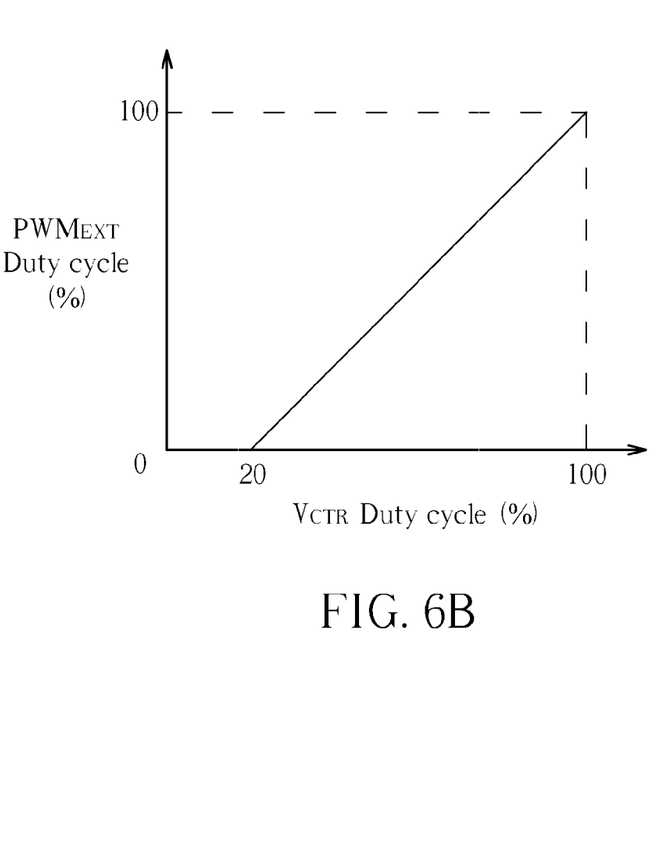

Please note that, the PWM rotating speed control circuit 504 shown in FIG. 5C is for illustrative purposes of the present invention, and those skilled in the art can make alternations and modifications accordingly. For example, please refer to FIG. 6A and FIG. 6B. FIG. 6A is a schematic diagram of the DC voltage signal $V_{PWM}$ related to the duty cycle of system control signal $V_{CTR}$. FIG. 6B is a schematic diagram of the duty cycle of the temperature control signal $PWM_{EXT}$ related to the duty cycle of the system control signal $V_{CTR}$. If amplitude of the oscillating signal $V_{OS2}$ is between 1 volt and 3 volt, and a stable rotating speed is needed when the duty cycle of the system control signal $V_{CTR}$ is less than 20%, the transforming unit 700 must be adjusted to make the DC voltage signal $V_{PWM}$ outputted by the transforming unit 700 over 3 volt when the duty cycle of the system control signal $V_{CTR}$ is less than 20%. In this way, the signal with duty cycle less than 20% cannot correspond to a duty cycle with the oscillating signal $V_{OS2}$, that is, the duty cycle of $PWM_{EXT}$ is 0, so as to avoid effects on the rotating speed by variations thereof.

In FIG. 5D, the rotating speed adjustment circuit 508 comprises resistors $R_7$, $R_8$, $R_9$, a capacitor $C_1$, a transistor 800, an oscillator 802 and a comparator 804. The oscillator 802 is utilized for generating an oscillating signal $V_{OS3}$. Preferably, a frequency of the oscillating signal $V_{OS3}$ is the same as that of the oscillating signal $V_{OS2}$, and is different from that of the oscillating signal $V_{OS1}$. The transistor 800 is preferably an n-type bipolar junction transistor, and is utilized for transforming the first control signal $PWM_{CTR1}$ into a DC voltage $V_{SET}$, which is compared with the oscillating signal $V_{OS3}$ to generate the second control signal $PWM_{CTR2}$. In such a condition, since the second control signal $PWM_{CTR2}$ is derived by comparing the DC voltage $V_{SET}$ and the oscillating signal $V_{OS3}$, the duty cycle thereof can stay in stable to avoid current ripples on the fan coil. On the other hand, since the oscillating signal $V_{OS3}$ of the rotating speed adjustment circuit 508 is different from the oscillating signal $V_{OS1}$ of the temperature-based rotating speed control circuit 502, the rotating speed can be less affected by inaccuracy of the passive devices.

Figure 7A:
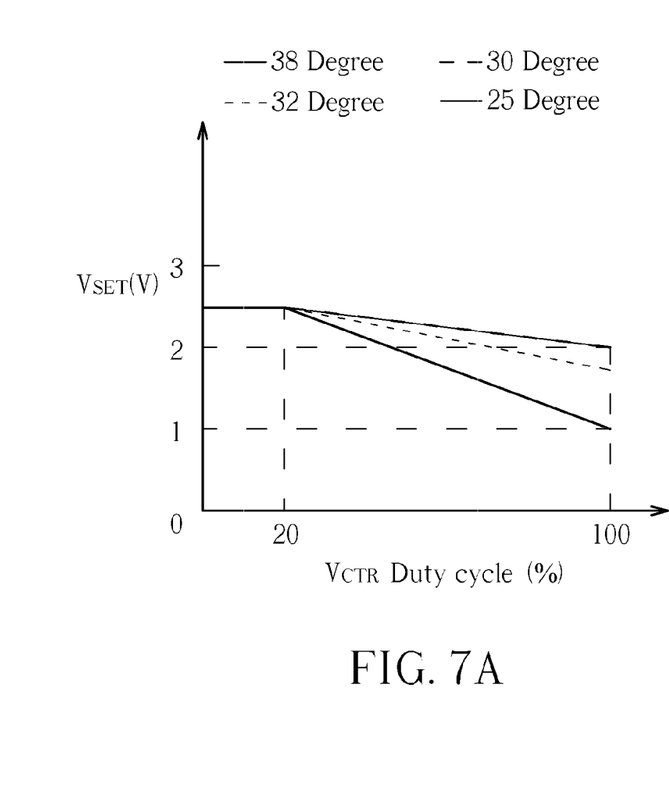
FIG. 7A and FIG. 7B are schematic diagrams of the duty cycle of signals related to the fan control system shown in FIG. 5A.
Figure 7B:
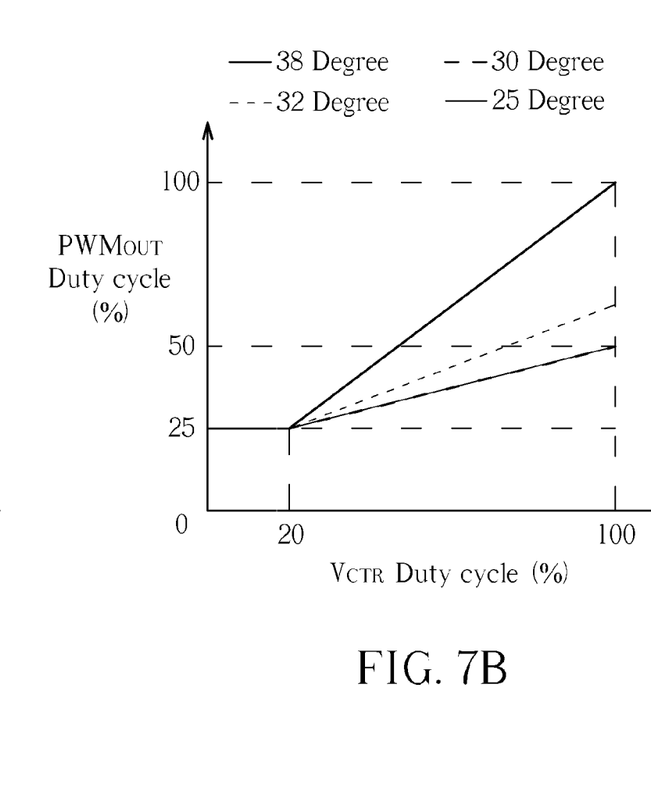
Figure 8:
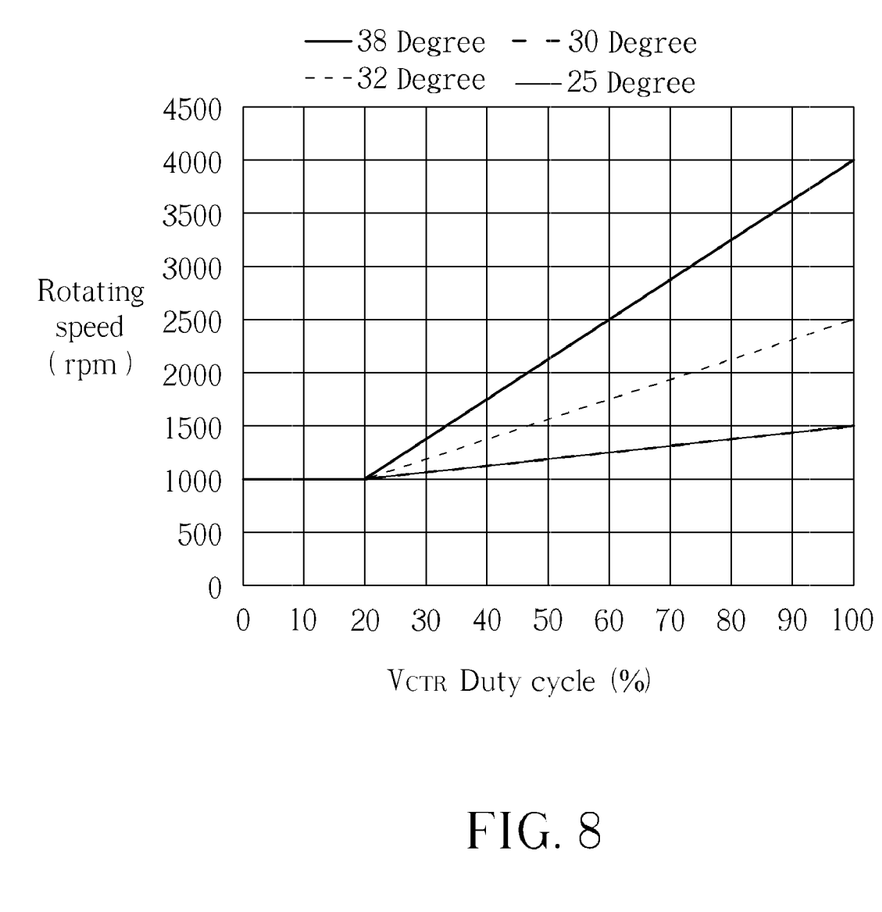
FIG. 8 is a schematic diagram of the rotating speed of the fan control system shown in FIG. 5A.

Therefore, the fan control system 50 can overcome the drawback of unstable rotating speed when the duty cycle of the system control signal $V_{CTR}$ is less than 20%. Thus, the present invention can enhance efficiency of heat dissipation, save energy and reduce noise. Take the above-mentioned condition for example, that is, the highest rotating speed of the heat dissipation fan 500 is 100% at 38° C. and the highest rotating speed of the heat dissipation fan 500 is 50% at 30° C. Please refer to FIG. 7A, FIG. 7B and FIG. 8. FIG. 7A is a schematic diagram of the duty cycle of the system control signal $V_{CTR}$ related to the DC voltage $V_{SET}$ in different working temperature. FIG. 7B is a schematic diagram of the duty cycle of the system control signal $V_{CTR}$ related to the temperature control signal $PWM_{OUT}$ in different working temperature. FIG. 8 is a schematic diagram of the rotating speed of the fan control system 50 related to the duty cycle of the system control signal $V_{CTR}$. As shown in FIG. 7A, FIG. 7B and FIG. 8, when the duty cycle of the system control signal $V_{CTR}$ is less than 20%, the DC voltage $V_{SET}$ will stay in stable and not change with temperature, thereby stabilizing the duty cycle of the temperature control signal $PWM_{OUT}$. In such a condition, when the duty cycle of the system control signal $V_{CTR}$ is less than 20%, the rotating speed of the heat dissipation fan 500 can stay in stable to eliminate unnecessary ripples and noise.

In conclusion, for the heat dissipation fan controlled by both temperature-based and PWM signals, when the duty cycle of the system control signal $V_{CTR}$ is less than the default duty cycle, the present invention can stabilize the rotating speed of the heat dissipation fan to avoid vibration and noise caused by current ripples on the fan coil. Moreover, since the oscillating signal $V_{OS3}$ of the rotating speed adjustment circuit 508 is different from the oscillating signal $V_{OS1}$ of the temperature-based rotating speed control circuit 502, the rotating speed can be less affected by inaccuracy of the passive devices. Therefore, the present invention can avoid vibration and noise caused by current ripples on the fan coil, and prevent inaccuracy of passive devices from affecting the rotating speed.

Those skilled in the art will readily observe that numerous modifications and alterations of the device and method may be made while retaining the teachings of the invention.

What is claimed is:

1. A fan control system for a heat dissipation fan comprising:
   a temperature-based rotating speed control circuit for sensing a temperature of the heat dissipation fan to generate a first temperature control signal;
   a pulse width modulation (PWM) rotating speed control circuit for receiving a system control signal to generate a second temperature control signal;
   an AND gate coupled to the temperature-based rotating speed control circuit and the PWM rotating speed control circuit, for performing an AND operation on the first temperature control signal and the second temperature control signal, so as to generate a first control signal;
   a rotating speed adjustment circuit comprising:
      a first node;
      a second node;
      a reception end coupled to the AND gate for receiving the first control signal;
      a first resistor coupled between a voltage source and the first node;
      a second resistor coupled between the first node and the second node;
      a third resistor coupled between the second node and a ground end;
      a capacitor coupled between the first node and the ground end;
      a transistor comprising a first end coupled to the reception end, a second end coupled to the second node, and a third end coupled to the ground end, for controlling a signal connection from the second end to the third end according to a signal of the first end;
      a first oscillator for generating a first oscillating signal; and
      a first comparator comprising a first input end coupled to the first node, a second input end coupled to the first oscillator and an output end, for comparing signals of the first node and the first oscillating signal, so as to output a second control signal via the output end; and
   a logic circuit coupled to the output end of the first comparator and the heat dissipation fan, for driving the heat dissipation fan according to the second control signal.

2. The fan control system of claim 1, wherein temperature-based rotating speed control circuit comprises:
   a temperature-controlled voltage generating unit for generating a first voltage signal according to the temperature of the heat dissipation fan;
   a lowest rotating speed voltage determining unit for generating a second voltage signal according to a default lowest rotating speed of the heat dissipation fan;
   a second oscillator for generating a first second oscillating signal; and
   a second comparator comprising a first input end coupled to the temperature-controlled voltage generating unit, a second input end coupled to the lowest rotating speed voltage determining unit, a third input end coupled to the second oscillator and an output end coupled to the AND gate, for comparing the first voltage signal, the second voltage signal and the second oscillating signal, so as to output the first temperature control signal to the AND gate via the output end of the second comparator.

3. The fan control system of claim 2, wherein the temperature-controlled voltage generating unit comprises:
   a first voltage division resistor coupled between the voltage source and the input end of thet second comparator; and
   a thermistor coupled between the first input end of the second comparator and the ground.

4. The fan control system of claim 2, wherein the lowest rotating speed voltage determining unit comprises:
   a second voltage division resistor coupled between the voltage source and the second input end of the second comparator; and
   a third voltage division resistor coupled between the second input end of the second comparator and the ground.

5. The fan control system of claim 2, wherein a frequency of the second oscillating signal generated by the second oscillator is different from that of the first oscillating signal generated by the first oscillator.

6. The fan control system of claim 2, wherein a frequency of the second oscillating signal generated by the second oscillator is less than that of the first oscillating signal generated by the first oscillator.

7. The fan control system of claim 2, wherein the temperature-based rotating speed control circuit further comprises a threshold voltage determining unit coupled to the second oscillator, for determining an amplitude of the second oscillating signal generated by the second oscillator.

8. The fan control system of claim 1, wherein the PWM rotating speed control circuit comprises:
   a transforming unit coupled to the system control signal for transforming the system control signal into a direct-current (DC) voltage signal;
   a third oscillator for generating a third oscillating signal; and
   a third comparator comprising a first input end coupled to the transforming unit, a second input end coupled to the third oscillator, and an output end coupled to the AND gate, for comparing the DC voltage signal and the second third oscillating signal, so as to output the second temperature control signal to the AND gate via the output end of the third comparator.

9. The fan control system of claim 8, wherein a frequency of the third oscillating signal generated by the third oscillator is the same as that of the first oscillating signal generated by the first oscillator.

10. The fan control system of claim 1, wherein the transistor is a bipolar junction transistor, the first end is a base, the second end is a collector and the third end is an emitter.

11. The fan control system of claim 10, wherein the bipolar junction transistor is an n-type bipolar junction transistor.

* * * * *